US011981459B2

(12) United States Patent
Shitrit et al.

(10) Patent No.: US 11,981,459 B2
(45) Date of Patent: May 14, 2024

(54) ARMED AERIAL PLATFORM

(71) Applicant: RAFAEL ADVANCED DEFENSE SYSTEMS LTD., Haifa (IL)

(72) Inventors: Arik Shitrit, Shechania (IL); Assaf Rubanenko, Atzmon (IL); Shai Cohen, Rechasim (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 18/017,894

(22) PCT Filed: Aug. 11, 2021

(86) PCT No.: PCT/IB2021/057394
§ 371 (c)(1),
(2) Date: Jan. 25, 2023

(87) PCT Pub. No.: WO2022/069957
PCT Pub. Date: Apr. 7, 2022

(65) Prior Publication Data
US 2023/0264837 A1 Aug. 24, 2023

(30) Foreign Application Priority Data
Sep. 29, 2020 (IL) .......................................... 277712

(51) Int. Cl.
*B64U 10/14* (2023.01)
*B64D 7/06* (2006.01)
(Continued)

(52) U.S. Cl.
CPC ............... *B64U 10/14* (2023.01); *B64D 7/06* (2013.01); *F41A 27/24* (2013.01);
(Continued)

(58) Field of Classification Search
CPC ........ B64D 7/02; B64D 7/06; B64U 2101/18; B64U 2101/20; B64U 2101/30; B64U 10/14; F41A 27/24
See application file for complete search history.

(56) References Cited

U.S. PATENT DOCUMENTS 2,284,611 A * 5/1942 Barnhart .................. F41G 5/04
89/37.17
6,868,768 B1 * 3/2005 Gieseke .................. F41A 23/24
89/1.13
(Continued)

FOREIGN PATENT DOCUMENTS

WO  2015029007 A1  3/2015

OTHER PUBLICATIONS

International Search Report.
International Written Opinion.

*Primary Examiner* — Joshua E Freeman
(74) *Attorney, Agent, or Firm* — Rivka Friedman

(57) ABSTRACT

An armed aerial platform (100) includes a weapon for firing a projectile from a barrel (102) that defines a weapon axis (104). The weapon is supported by a single-axis gimbal mechanism (116) within a central vertical slot (112) in a rigid body (108) of a UAV (108) carried by a propulsion system (114) including at least four rotary propulsion units. The gimbal mechanism (116) provides an elevation adjustment of the weapon axis (104), while the azimuth adjustment is provided by motion of the UAV (108) itself.

16 Claims, 7 Drawing Sheets

(51) Int. Cl.
*F41A 27/24* (2006.01)
*B64U 101/18* (2023.01)
*B64U 101/20* (2023.01)
*B64U 101/30* (2023.01)

(52) U.S. Cl.
CPC ...... *B64U 2101/18* (2023.01); *B64U 2101/20* (2023.01); *B64U 2101/30* (2023.01)

(56) References Cited

U.S. PATENT DOCUMENTS

| | | | |
|---|---|---|---|
| 8,297,172 B2 * | 10/2012 | Nelson | F41F 3/065 |
| | | | 89/43.01 |
| 8,857,312 B2 * | 10/2014 | Nelson | F41F 3/06 |
| | | | 89/43.01 |
| 2010/0282058 A1 * | 11/2010 | Nelson | F41A 25/22 |
| | | | 89/27.3 |
| 2011/0221692 A1 * | 9/2011 | Seydoux | A63H 30/04 |
| | | | 345/173 |
| 2014/0150631 A1 * | 6/2014 | Nelson | B64D 7/06 |
| | | | 89/27.3 |
| 2015/0108215 A1 * | 4/2015 | Ehrlich | F41G 3/12 |
| | | | 235/404 |
| 2018/0162527 A1 * | 6/2018 | Hupp | G05D 1/0038 |
| 2019/0367169 A1 * | 12/2019 | O'Leary | B64U 60/50 |
| 2021/0403157 A1 * | 12/2021 | Thompson | G06T 17/20 |
| 2022/0373277 A1 * | 11/2022 | Kipnis | F41A 19/13 |

* cited by examiner

ARMED AERIAL PLATFORM

FIELD AND BACKGROUND OF THE INVENTION

The present invention relates to unmanned aerial vehicles (UAVs) and, in particular, it concerns an armed aerial platform in which a multi-rotor UAV carries a weapon, and a corresponding UAV system and method.

It is known to use UAVs for a wide range of tasks including carrying a weapon to be fired at a target. Particularly in the case of a weapon firing a projectile from a barrel, the recoil of the weapon may lead to a sudden jolt of the UAV and a consequent loss of alignment with the target, resulting in significant delay in restoring alignment for subsequent damage assessment and/or further firing at the target.

SUMMARY OF THE INVENTION

The present invention is an armed aerial platform in which a multi-rotor UAV carries a weapon, and a corresponding UAV system and method.

According to the teachings of an embodiment of the present invention there is provided, an armed aerial platform comprising: (a) a weapon for firing a projectile from a barrel, the barrel defining a weapon axis; and (b) a UAV comprising: (i) an airframe including a rigid body, the rigid body being formed with a central vertical slot for receiving the weapon, (ii) a propulsion system including at least four rotary propulsion units supported by the airframe in a multirotor UAV configuration, and (iii) a single-axis gimbal mechanism supporting the weapon within the slot and controlling an inclination angle of the weapon axis relative to the body.

According to a further feature of an embodiment of the present invention, the gimbal mechanism supports the weapon within the slot such that the weapon axis passes substantially through a center of gravity of the armed aerial platform.

According to a further feature of an embodiment of the present invention, the gimbal mechanism supports the weapon so as to be pivotable about a pivot axis substantially aligned with the center of gravity of the armed aerial platform.

According to a further feature of an embodiment of the present invention, the rigid body defines a horizontal reference plane, and wherein the slot is an open-ended slot extending to one end of the body, the gimbal mechanism configured to control an inclination of the weapon axis through a range of angles spanning a direction parallel to the horizontal reference plane.

According to a further feature of an embodiment of the present invention, the UAV is a man-portable UAV.

According to a further feature of an embodiment of the present invention, the weapon is a self-loading weapon for firing a plurality of projectiles from the barrel.

According to a further feature of an embodiment of the present invention, there is also provided a control system including at least one processor, the control system in communication with the gimbal mechanism and with the propulsion system, the controller responsive to an alignment adjustment signal to: (a) actuate the gimbal mechanism to change an inclination angle of the weapon axis; and (b) actuate the propulsion system to change an azimuthal alignment of the weapon axis.

According to a further feature of an embodiment of the present invention, the control system is configured to perform a tracking algorithm to generate the alignment adjustment signal.

According to a further feature of an embodiment of the present invention, there is also provided at least one image sensor mounted on the armed aerial platform and in communication with the control system, the tracking algorithm including image processing to track a target within images from the at least one image sensor.

According to a further feature of an embodiment of the present invention, the at least one image sensor includes a first image sensor having a first field of view and a second image sensor having a second field of view, the second field of view being smaller than the first field of view, and wherein at least the second image sensor is associated with the weapon so that the second field of view is aligned parallel to the weapon axis.

According to a further feature of an embodiment of the present invention, the tracking algorithm further generates a firing actuation signal synchronized with variations in a time-varying misalignment of the weapon axis relative to an aim point, the aim point being calculated as a function of a location of the target within images from the at least one image sensor.

There is also provided according to the teachings of an embodiment of the present invention, a UAV system comprising: (a) the aforementioned armed aerial platform; and (b) a remote controller station, wherein the armed aerial platform further comprises: at least one image sensor mounted on the armed aerial platform, an onboard communications subsystem for transmitting images from the at least one image sensor and for receiving control signals for controlling the armed aerial platform, and wherein the remote controller station comprises: a remote communications subsystem, a display, a user input device and a remote controller associated with the remote communications subsystem, the display and the user input device, wherein the remote controller is configured to receive the images via the remote communications subsystem, to display the images on the display, and to receive from the user input device an input indicative of a target location within the images, the input being used to generate the control signals for transmission to the armed aerial platform.

According to a further feature of an embodiment of the present invention, the user input device includes a fire weapon input for generating a fire command for transmission to the armed aerial platform.

There is also provided according to the teachings of an embodiment of the present invention, a method for operating a multirotor UAV having a weapon mounted on a single-axis gimbal relative to the UAV, the method comprising the steps of: (a) acquiring a target in images derived from an image sensor mounted on the UAV; and (b) aligning an axis of the weapon with the target by a combination of motion of the single-axis gimbal to align the weapon relative to the UAV about one axis and maneuvering the UAV about at least one additional axis.

According to a further feature of an embodiment of the present invention, the method further comprises the steps of: tracking the target in the images derived from the image sensor and adjusting the single-axis gimbal and the UAV orientation to maintain the weapon axis aligned with the target.

According to a further feature of an embodiment of the present invention, the method further comprises the step of generating a firing actuation signal synchronized with variations in a time-varying misalignment of the weapon axis relative to an aim point, the aim point being calculated as a function of a location of the target within images from the image sensor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an armed aerial platform in which a multirotor UAV carries a weapon, and a corresponding UAV system and method.

The principles and operation of armed aerial platforms, system, and methods according to the present invention may be better understood with reference to the drawings and the accompanying description.

Figure 1:
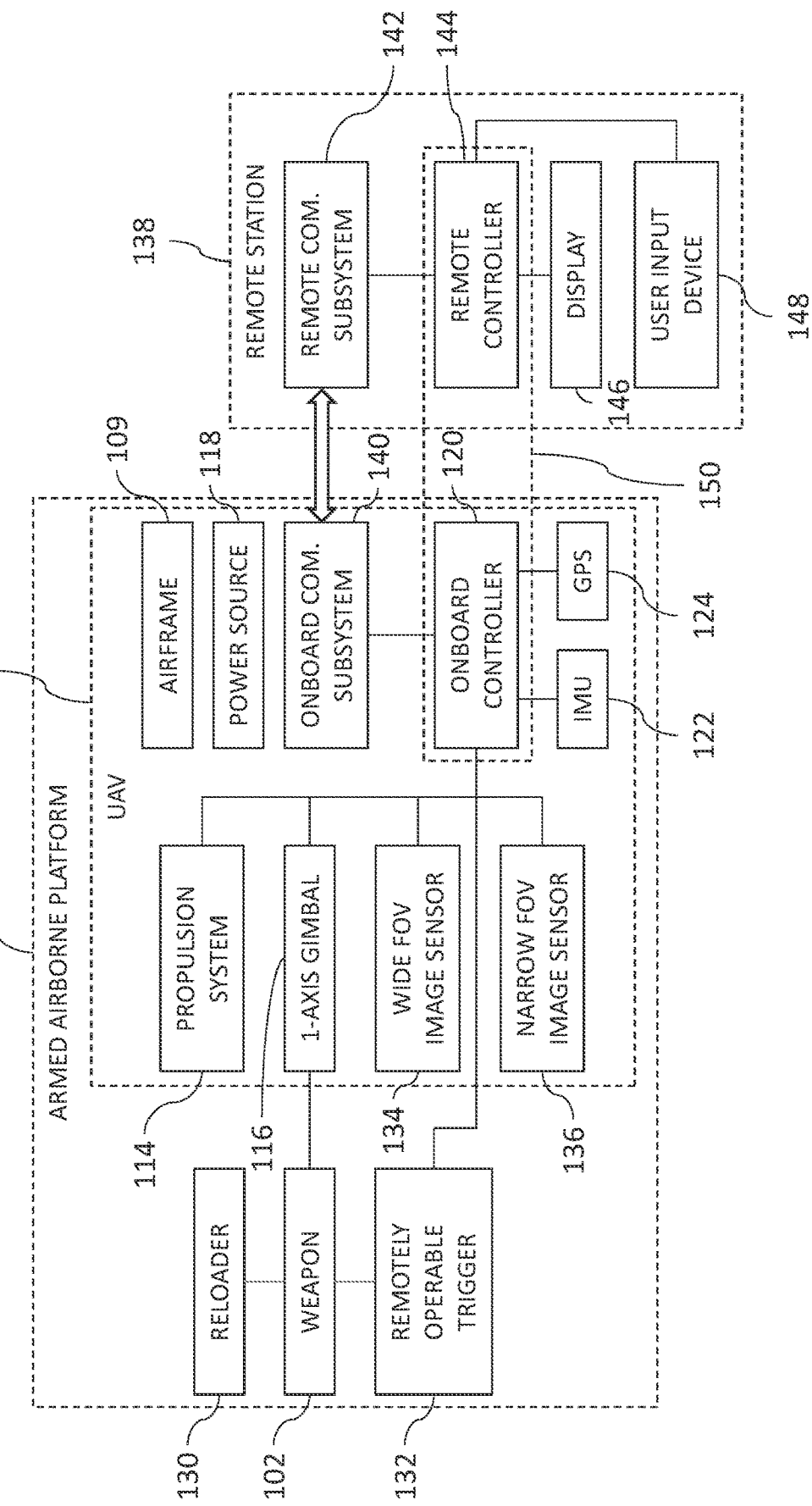
FIG. 1 is a block diagram of a UAV system including an armed aerial platform according to an embodiment of the present invention.

Referring now to the drawings, FIGS. 1-7 illustrate aspects of an armed aerial platform, a corresponding UAV system, and corresponding methods of operation, according to a non-limiting preferred embodiment of the present invention. FIG. 1 illustrates schematically the functional relationships between the system components, while FIGS. 4-7 illustrate a non-limiting structural implementation of the armed aerial platform, generally designated 100. In general terms, an embodiment of armed aerial platform 100 includes a weapon 102 for firing a projectile from a barrel 104 (illustrated in FIG. 7), the barrel defining a weapon axis 106, and a UAV 108. The UAV 108 includes an airframe 109 which, as illustrated in FIGS. 4-7, includes a rigid body 110 formed with a central vertical slot 112 for receiving weapon 102, and a propulsion system 114 including at least four rotary propulsion units 114a and 114b supported by the airframe in a multirotor UAV configuration. A single-axis gimbal mechanism 116 (best seen in FIG. 5B) supports weapon 102 within slot 112 and controls an inclination angle of weapon axis 106 relative to body 110.

It will be immediately appreciated that the mounting of weapon 102 gimbaled about a single axis within a central vertical slot 112 of the UAV provides advantages of construction and operation. Firstly, the use of a single-axis gimbal mechanism renders the gimbal mechanism simple and lightweight, and allows the mounting of the weapon within a slot. This in turn facilitates positioning of the weapon so that weapon axis 106 passes substantially through a center of gravity of the UAV 108, thereby minimizing any rotary component of a recoil impulse from firing of the weapon. This facilitates maintaining stability of the UAV during firing, thereby avoiding loss of target tracking between shots, allowing repeated firing and/or damage assessment immediately after firing.

Clearly, aiming of a weapon at a target requires control of the weapon direction about at least two axes. An implementation of the present invention employing a single-axis gimbal mechanism is predicated on the observation that a multirotor UAV can itself be used effectively to provide control of the azimuth component of the aiming direction of a weapon, such that aiming is achieved by a combination of the gimbal mechanism motion about a first axis together with the UAV motion about a second axis.

A large proportion of the benefit of having the weapon axis 106 pass through to the center of gravity of the UAV is inherently achieved by mounting the weapon within central vertical slot 112, thus bringing the weapon close to the center of gravity, without necessarily requiring precise alignment of the weapon axis and the center of gravity. To optimize these advantages, it may be preferable to design the device to satisfy, or at least approximate, to one or more of the following conditions:

Alignment of the weapon axis and the center of gravity of the armed airborne platform as a whole.

Alignment of the gimbal axis at or near the weapon center of gravity helps to avoid significant shift of the weapon center of gravity relative to the UAV during pivotal motion of the weapon.

Combining the above conditions may lead to a preference to align both the centers of gravity of both the weapon and the UAV close to each other, and close to the gimbal axis. Nevertheless, alignment of the weapon axis with the center of gravity of the UAV will typically take precedence over a small offset between centers of gravity.

Turning now to the features of an embodiment of the present invention in more detail, the term "UAV" is used herein to refer to any unmanned aerial vehicle, of any size, weight or dimensions. The term "multirotor UAV" is used to refer to any UAV that employs at least 4 rotary propulsion units deployed around the periphery of the UAV to provide lift. The propulsion units are typically located in an even number of positions around the periphery of the UAV, and each position may be provided with one or more propulsion unit, typically deployed coaxially. Particularly common but non-limiting examples of configurations suitable for implementing the present invention include configurations with 4 or 6 rotor positions, each with one or two propulsion units. The particular non-limiting example illustrated in FIGS. 4-7 employs two coaxial propulsion units 114a and 114b at each of 4 positions, for a total of 8 propulsion units. The propulsion units are typically in pairs with opposite directions of rotation so as to cancel out and/or control yaw motion induced by the drag of the rotors. In the non-limiting example illustrated here, the four upper propulsion units 114a have rotors turning clockwise as viewed from above, while the four lower propulsion units 114b have rotors turning counterclockwise as viewed from above. In all respects other than explicitly discussed herein, the structure and operation of the UAV and its components are essentially similar to the corresponding structure and operation of conventional multirotor UAV's, and will be fully understood by a person having ordinary skill in the art. Thus, details of the propulsion unit designs, a power source 118, and aspects of an onboard controller 120 operating according to inputs from an inertial measurement unit (IMU) 122 and/or a global positioning system (GPS) sensor 124 to provide basic flight functionality, are all well-known in the art, and will not be described here in detail.

In certain applications, UAV 108 may advantageously be a man-portable UAV, meaning that it is suitable in both weight and size to be carried by a single operator, typically in a dedicated backpack. To this end, the weight of the UAV 108 is preferably no more than 15 kg, and in some cases no more than about 10 kg. In other applications, UAV 108 may be deployed from a vehicle-mounted platform, on a land vehicle or a boat, in which case a larger/heavier UAV may be used, all according to the design requirements of the intended application, the desired range, etc.

Figure 7:
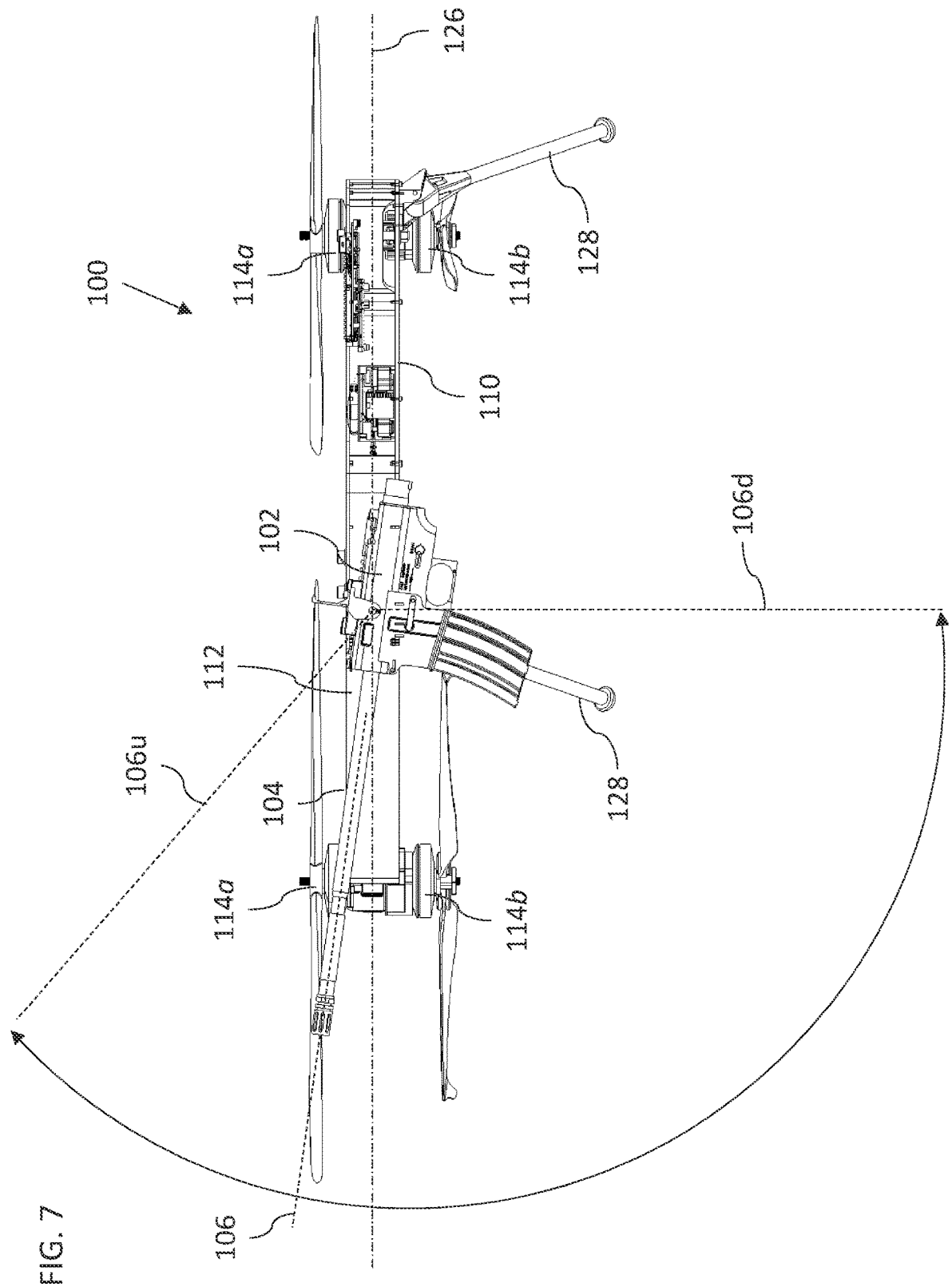
FIG. 7 is a cross-sectional view taken along the line VII-VII in FIG. 6.

Central vertical slot 112 may be any slot that can accommodate at least part of weapon 102 positioned so that the weapon axis 106 passes through or near the center of gravity of the armed airborne platform 100, and thus may be a closed slot, open only in a downwards direction, or a through slot, extending through body 110 from top to bottom. Where the armed airborne platform is only required to aim the weapon axis in a generally downward direction, slot 112 may be closed at both ends. Where a range of weapon axis angles crosses a plane of extension of the body 110, referred to herein colloquially as a "horizontal reference plane" 126 (since it is typically maintained roughly horizontal during stable hovering of UAV 108), slot 112 is advantageously implemented as an open-ended slot which is open at one end of body 110. FIG. 7 illustrates one preferred but non-limiting implementation in which a range of angles of the weapon axis 106 spans a range above and below the reference plane from an uppermost angle 106u about 45 degrees above the horizontal reference plane)(+45°) through to an extreme downward angle 106d of about 90 degrees below the horizontal reference plane)(-90°), corresponding to a generally vertically-downwards direction. If desired, a span of +90 through -90 degrees could be provided which, together with the azimuthal mobility of the platform, would give omnidirectional coverage. Conversely, for applications where the usage scenario is well-defined, it may be sufficient to implement gimbal mechanism 116 with a smaller range of angular motion covering the range of angles expected to be needed.

Gimbal mechanism 116 may be implemented using any gimbal mechanism suitable for the weight of the weapon to be supported, and providing a speed of motion and resolution of adjustment according appropriate to the intended application. The need for only a single axis of motion greatly simplifies gimbal implementation compared to multi-axis gimbals, and suitable gimbal mechanisms are available from many commercial sources. Typical implementations employ an electric motor with a step-down transmission. The weapon is typically supported via attachment to a clamp, bracket or cradle that is integrated with the output axle of the gimbal mechanism, and is preferably supported by bearings relative to the sides of slot 112.

The part of airframe 109 bordering slot 112 is rigid body 110 that provides structural integrity and rigidity between the two sides of the slot during operation. Particularly where slot 112 is a through-slot open to one end of body 110, body 110 may optionally be reinforced with various plates or other reinforcing elements which extend around the sides of the slot and impart the desired degree of rigidity between the sides. Additionally, or alternatively, structural integrity between the two sides of the slot may be enhanced by providing one or more bridging element (not shown) located in such a position that it does not impede the required range of angular motion of the weapon.

For compact portability, airframe 109 may also include a plurality of foldable arms 111 that support propulsion units 114a and 114b relative to rigid body 110. The foldable arms 111 may be foldable about one or more pivotal joint, and may optionally be telescopic (not shown), allowing folding of the arms to a stowed position (not shown) when not in use, for compact storage and/or portability, as is known in the art. Deployment between the stowed position and a deployed position is typically performed manually, with the arms locking in their deployed position until manually released. Although such foldable configurations are believed to be advantageous, it will be clear that the present invention can also be implemented using a non-folding airframe. A number of legs 128, preferably also foldable for compact storage, are deployed for supporting the UAV 108 on the ground with sufficient ground clearance for operation of the propulsion unit rotors during take-off and landing.

Turning now to weapon 102, this may be any type of weapon which fires a projectile from a barrel 104, of any caliber and any type. Although single shot weapons may be used, particularly preferred implementations of the present invention employ reloadable weapons, preferably with a reloader 130 (FIG. 1) which loads a new projectile into a chamber after each projectile is fired. The reloader may be a standard reloader as typically implemented in semi-automatic firearms, or any other dedicated (for example, robotic) reloader mechanism. The projectiles may be any sort of projectile that can be fired from a barrel. In the non-limiting case illustrated here, the projectiles are bullets integrated with a cartridge containing a primer and propellant charge in a casing. Weapon 102 is modified to allow remote operation by addition of a remotely operable trigger 132, which is typically linked to onboard controller 120 for operation according to criteria to be discussed further below.

Remote operation of the armed airborne platform 100 is preferably facilitated by one or more image sensors. In the particularly preferred example illustrated in FIG. 1, at least two image sensors are provided: a wide field of view (FOV) image sensor 134, typically rigidly mounted on airframe 109, and a narrow FOV image sensor 136, which is preferably roughly centered on the weapon axis 106 and moves with the weapon 102. Movement of the narrow FOV image sensor 136 may be achieved either by mounting the weapon 102 directly, or by mounting the image sensor directly to a part of the gimbal mechanism 116. The angular extent of the "wide FOV" and "narrow FOV" are chosen according to the application and expected range to a target, preferably such that the wide FOV provides sufficient context for acquiring a target, while the narrow FOV provides sufficient angular resolution for reliable target verification and for accurate weapon aiming. By way of a non-limiting example, in certain applications, an angular extent of the wide FOV may be in excess of 30 degrees, while an angular extent of the narrow FOV may be no more than about 10 degrees. In some cases, the wide FOV image sensor may cover a much larger angular range in order to cover the entire range of gimbal motion for the weapon axis. Alternatively, for large angular ranges of motion, the wide FOV image sensor may also be mounted so as to move together with the weapon axis. In some cases, it may be desirable to provide one or more additional image sensor (not shown) with a different FOV and/or viewing direction, for use in navigation of the UAV. Each of the aforementioned image sensor may be of any suitable technology with sensitivity to any desired wavelength range. Typical examples include: visible light cameras, near IR cameras and thermal cameras, with some implementations employing a combination of two or more camera types for one or both of the image sensors 134 and 136, for example, to provide enhanced all-weather and all-lighting-conditions operation.

Armed aerial platform 100 is preferably part of a UAV system which further includes a remote controller station 138, which allows operation of the armed aerial platform by an operator located remotely from the UAV. "Remotely" in this context means any location that is not moving with the UAV, and can be physically in close proximity to the UAV or can be an arbitrarily located control station which may be at a distant location. Communications between the armed airborne platform 100 and the remote controller station 138 is provided by an onboard communications subsystem 140 which communicates directly or indirectly with a remote communications subsystem 142. The communications may be via any suitable wireless communications technology, operating in any part of the EM spectrum, including but not limited to: RF communications, microwave communications and optical communications, and may be a direct communication link between the communication subsystems 140 and 142, or may be via an intervening communications network, optionally using a mixture of different technologies. Only the last link of a networked communication architecture need be wireless, while other parts of the communication path may be wired, such as via metal wires or via optical fibers.

Remote controller station 138 also has a remote controller 144, which includes one or more processors (not shown), data storage and other generally conventional components required for implementing the functions described herein, as are well-known in the art. The remote controller 144 is preferably associated with a display 146 and one or more user input device 148. The display and the input device may be implemented as any user interface suitable for controlling a UAV and/or weapon system, ranging from a conventional screen and pointing device through to an immersive virtual reality (VR) headset and dedicated controls, where sensed head and/or eye motion may optionally also be used as an alignment input.

Onboard controller 120 and remote controller 144 are preferably part of an overall control system, also referred to as the processing system, 150, which may optionally include additional computing resources (not shown) located elsewhere or allocated dynamically from a networked cloud, which collectively provides the various processing modules required for all aspects of operation of the UAV system. While certain functions may intuitively lend themselves more to specific implementations (such as real-time stability of flight adjustments typically being performed by onboard controller 120), the allocation of processing resources between different locations is essentially flexible, and any function can be performed by any part of control system 150, or split between multiple locations, all according to the particular requirements of any given implementation.

The mode of operation of the UAV system may range from direct manual control by a remote operator through to highly automated operation. In a direct manual control implementation, the user interface provided by remote controller station 138 may include a conventional interface for flying a UAV, receiving and displaying images from the wide FOV sensor via the communications link and controlling flight of the UAV via the user input devices 148 in a conventional manner. In addition to flight controls, the operator is preferably able to switch to viewing the narrow FOV sensor images (or to view them in parallel to the wide FOV) via display 146, to control the gimbal 116, and to actuate the remotely operable trigger 132.

Figure 3:
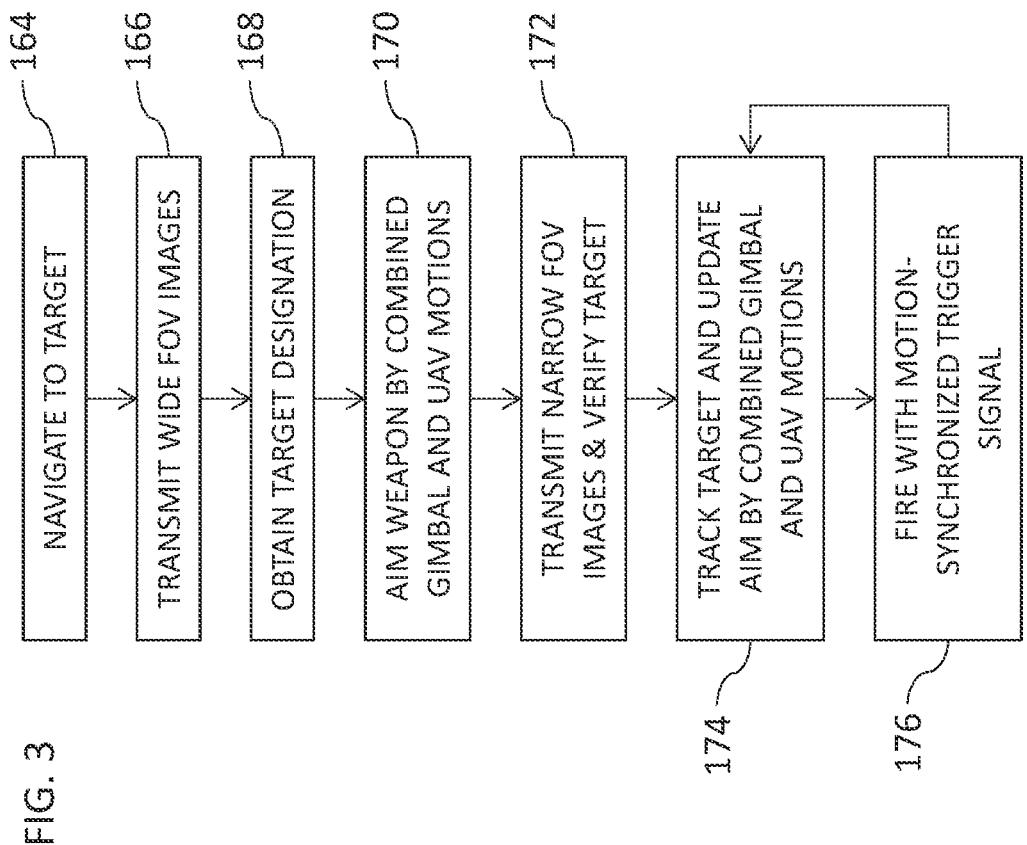
FIG. 3 is a flow diagram illustrating operation of the UAV system of FIG. 1.

More preferably, various modules, optionally providing various aspects of automation, are implemented through control system 150. One non-limiting example of a set of modules implemented using control system 150, and a non-limiting example of a corresponding sequence of operation, are illustrated in FIGS. 2 and 3, respectively.

Figure 2:
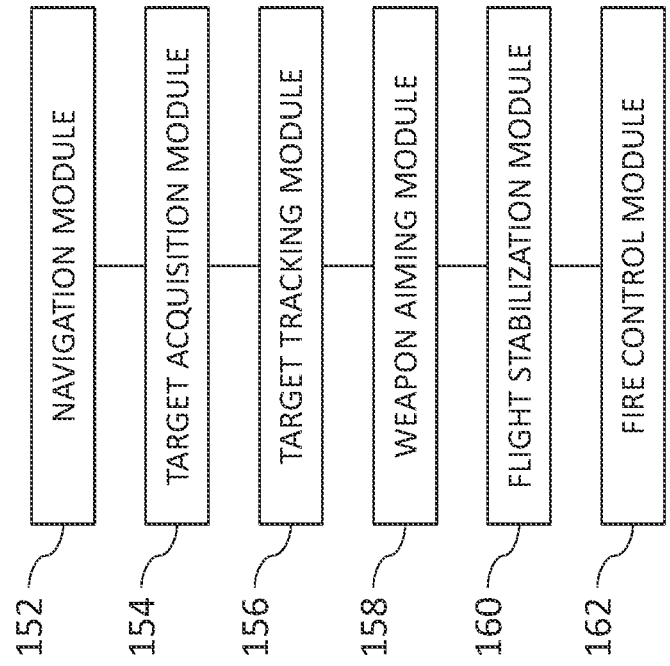
FIG. 2 is a block diagram of a number of modules of a control system from the UAV system of FIG. 1.
Figure 4:
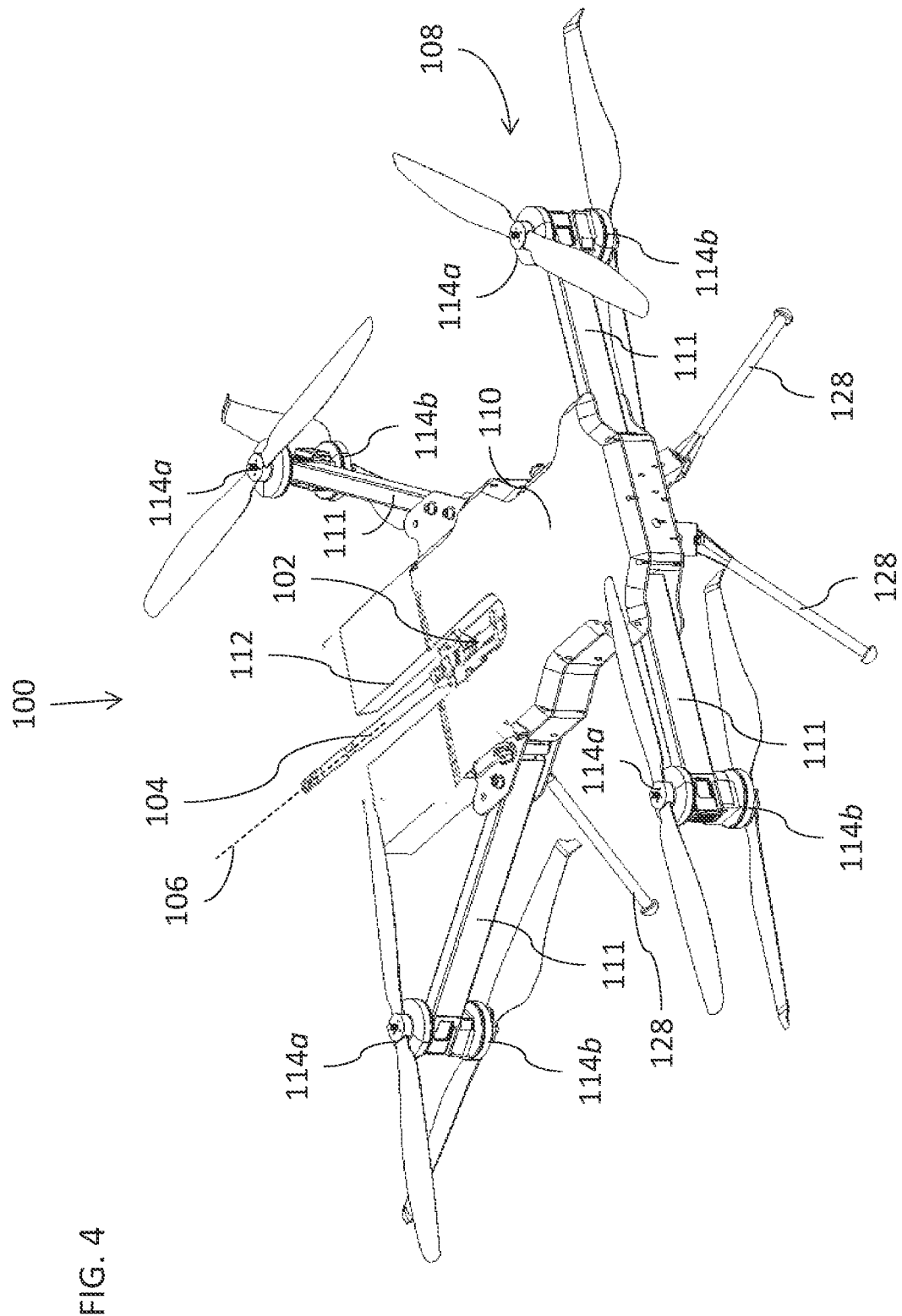
FIG. 4 is an isometric view of an embodiment of the armed aerial platform of FIG. 1.
Figure 5A:
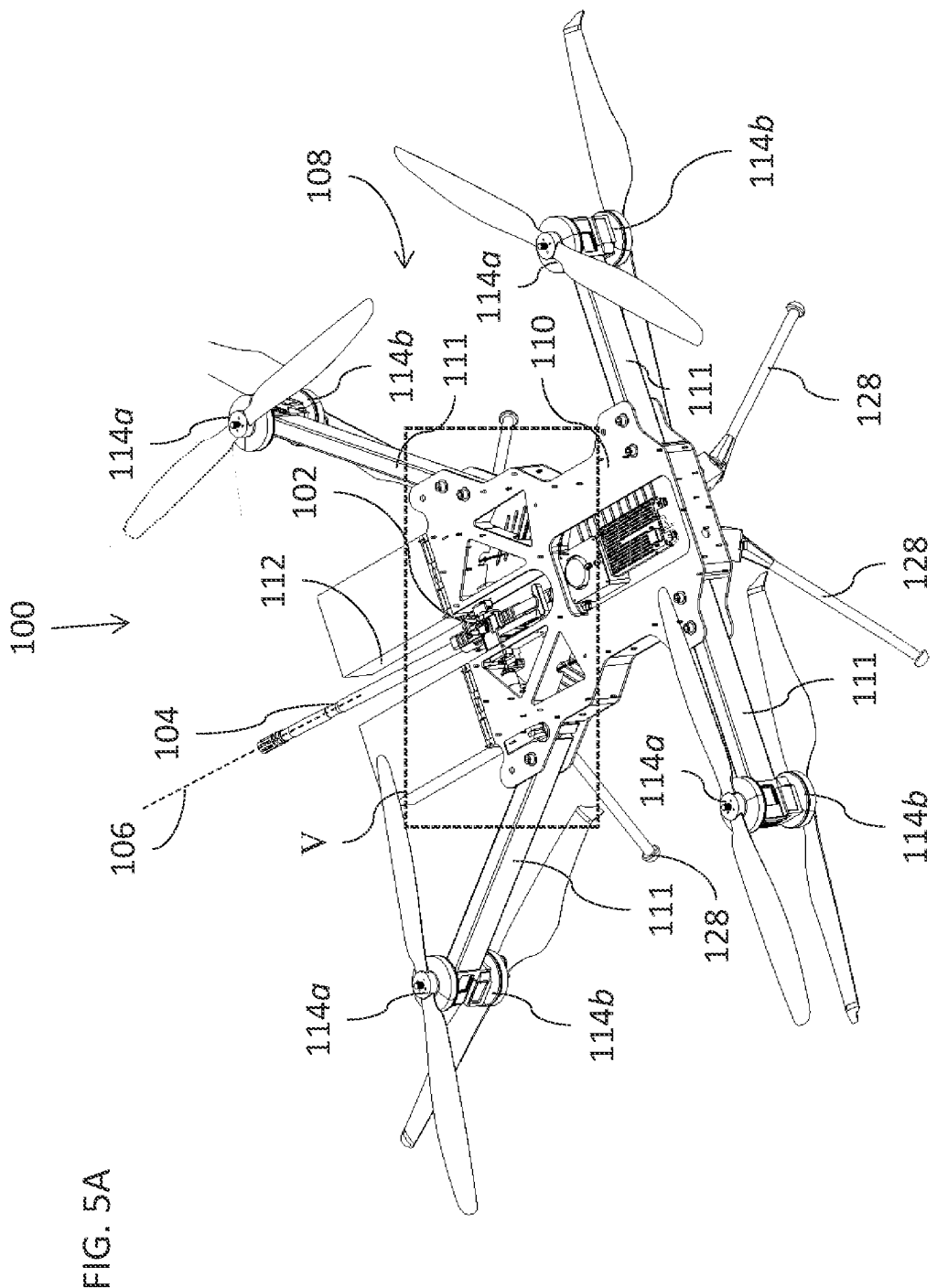
FIG. 5A is an isometric view of the armed aerial platform of FIG. 4 with an upper cover removed.
Figure 5B:
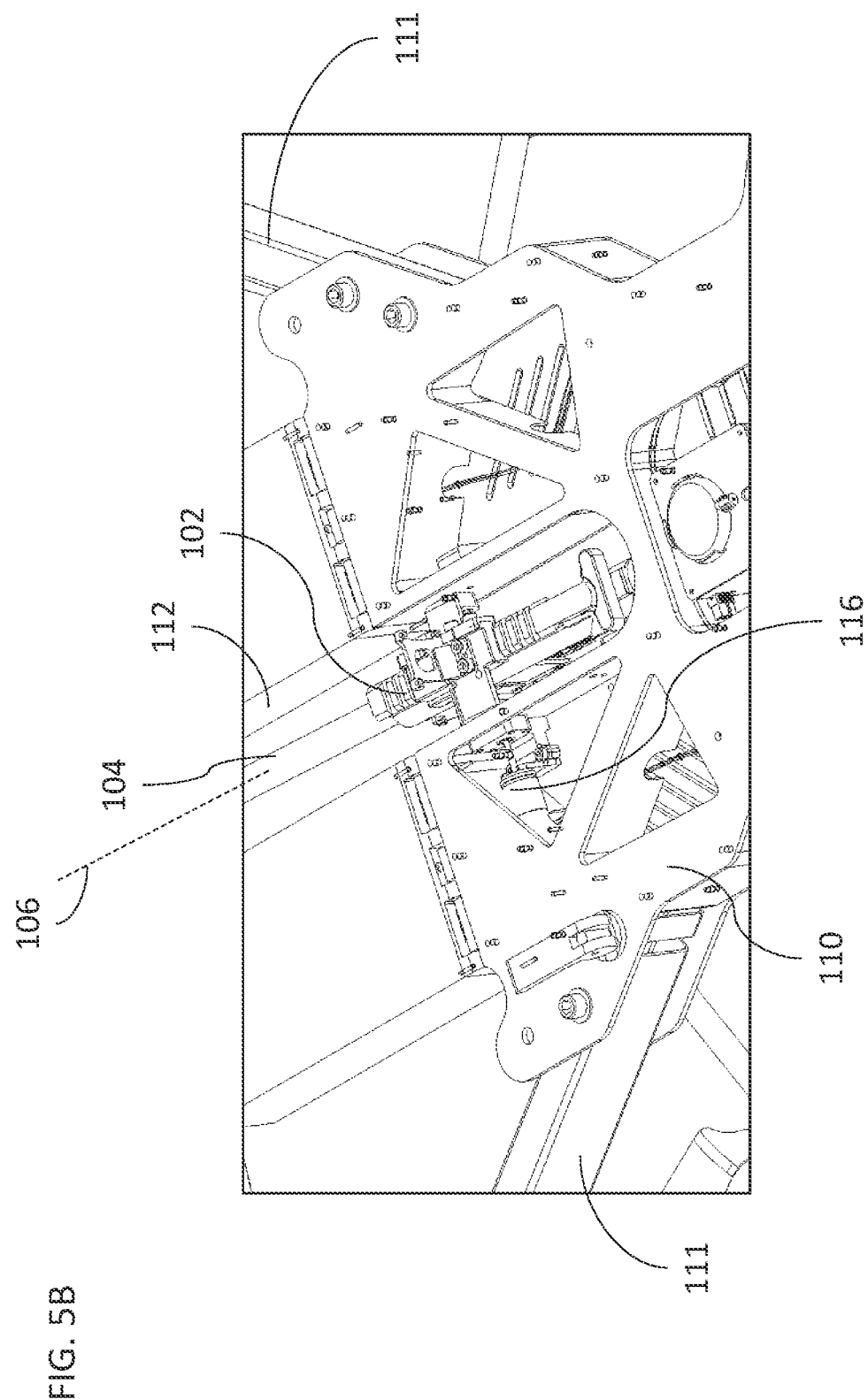
FIG. 5B is an enlarged view of the region of FIG. 5A designated by a dashed rectangle designated "V"
Figure 6:
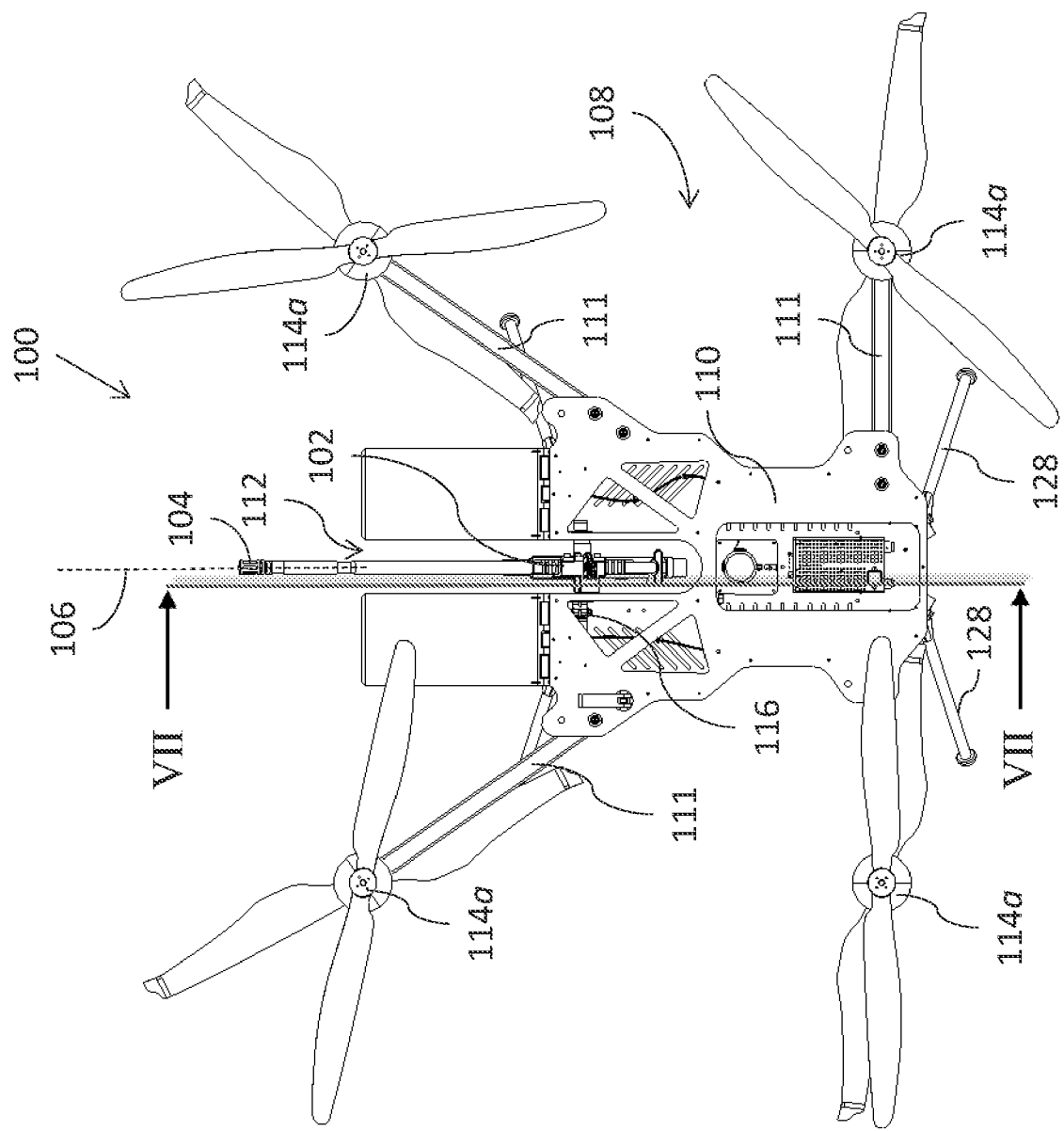
FIG. 6 is a top view of the armed aerial platform of FIG. 4.

Turning now to FIG. 2, the major modules of the control system 150 according to certain implementations of the present invention may include:

A navigation module 152, which preferably controls all aspects of the flight and navigation of the UAV 108. This typically includes the avionics for controlling stable flight of the UAV, and may also include various autopilot navigation capabilities, for example, allowing automated navigation to a known target location by known navigation techniques.

A target acquisition module 154 which allows designation or other acquisition of a target. The target acquisition module 154 typically identifies a target, or a trackable feature of a target, within images from one or both of the image sensors 134, 136. Designation of a target may be performed by a human user providing an input via the user input device 148, typically by bringing a symbol into alignment with the target as displayed on the display 146 and pressing a button. The designation may optionally be enhanced by automated selection of trackable features on the selected target. Alternatively, in certain cases, automated target acquisition may be provided, selecting a candidate target according to known techniques for automated target acquisition, for subsequent confirmation by a human user prior to firing.

A target tracking module 156 which proceeds to track a designated target, typically in images from the narrow FOV image sensor 136, and a weapon aiming module 158 which adjusts the alignment of the weapon to bring the weapon axis into alignment with an aim point associated with the tracked target. The "aim point" is typically the point at which the weapon axis should be aimed in order to achieve an effective hit on the target. This may be a point on the target itself, or may be a calculated virtual aiming point displaced from the target, for example, slightly above the target, to allow for ballistic corrections or any other corrections required by the system or operating conditions. Tracking algorithms are well-known, and will not be described here in detail. The weapon aiming process in this case typically includes adjustment of the elevation and the azimuth of the weapon axis, where the elevation is adjusted via gimbal mechanism 116 while the azimuth is adjusted by rotation of the entire UAV 108, such as by introducing a differential speed between the clockwise-spinning rotors and the counterclockwise-spinning rotors, as is know in the art of multi-rotor UAVs.

A flight stabilization module 160 may be provided to stabilize the UAV in a manner optimal for maintaining the aim of the weapon. Operation of flight stabilization module 160 in this context may be significantly different from conventional flight control of hovering, since maintaining alignment of the weapon axis with the target here takes priority over cancelling horizontal drift of the UAV. The flight stabilization required here may therefore advantageously be implemented using closed-loop control of the UAV flight (and gimbal) to maintain the tracked target (or the aim point) centered in the images from narrow FOV image sensor 136 as it is tracked. Thus, in certain cases, the functions of target tracking module 156, weapon aiming module 158 and flight stabilization module 160 may be advantageously integrated.

A fire control module 162 may advantageously be provided to receive and execute a fire command input from the user input device 148, and optionally to synchronize firing with variations in a time-varying misalignment of the weapon axis relative to an aim point, for example, as the weapon axis crosses the aim point.

Turning now to FIG. 3, this illustrates a non-limiting implementation of a typical sequence of operation of the UAV system according to FIGS. 1 and 2. At step 164, the UAV is navigated, manually or automatically, to the location of a target, and images from the wide FOV image sensor 134 are transmitted from the UAV to the remote control station 138 for display via display 146 to the remote operator (step 166). A target designation is preferably then obtained (step 168), typically by an input from the remote operator selecting an object or trackable target feature via user input device 148. The user input via input device 148 is preferably indicative of a target location within the images, and is used to generate control signals for transmission to the armed aerial platform 100. At the other end of the range of implementations, in cases where the tracking and aiming are performed primarily by the onboard controller, the control signal may correspond simply to a pixel location within a designated one of the images transmitted to the remote station. In other implementations, where the tracking processing is performed via a remote part of control system 150, the control signals transmitted to the armed airborne platform 100 may be direct remote flight controls and/or gimbal control signals.

The weapon is then aimed at the target by combined use of gimbal mechanism 116 for the elevation axis and rotation of the UAV 108 for the azimuth axis (step 170). Aiming of the weapon preferably also brings narrow FOV image sensor 136 into alignment with the target, so that the target can be verified by the remote operator viewing the images transmitted from the narrow FOV image sensor 136 via the communications link 140, 142 for display on the display 146 (step 172). The target is then tracked, and the aim of the weapon adjusted according to an alignment adjustment signal in order to keep the weapon on target, preferably with corresponding weapon-alignment prioritized flight stabilization (step 174). The alignment adjustment signal may be generated by a tracking algorithm of target tracking module 156, or in other implementations, may be an operator generated alignment adjustment signal generated on the basis of the input from the operator.

When ready, the operator provides an input to actuate firing. At that point, the fire control module 162 preferably triggers firing of the weapon synchronized with the time-varying misalignment of the weapon axis relative to the aim point, as mentioned above, thereby maximizing the likelihood of an accurate hit on the target (step 176).

Due to the positioning of the weapon 102 in the central vertical slot 112, near the center of gravity of the armed airborne platform 100, the recoil from firing the weapon typically does not significantly destabilize the armed airborne platform 100. As a result, narrow FOV image sensor 136 typically maintains, or quickly recovers, its line of sight to the target, allowing an immediate decision of the remote operator regarding damage assessment and/or firing of additional projectiles towards the same target. Thus, optionally, the method may pass immediately after step 176 back to step 174, allowing repeated firing on a tracked target, typically at a rate similar to the manual use of weapon 102. Thus, for example, if weapon 102 is a self-loading rifle, the UAV system preferably allows a firing repeat rate of at least one shot every five seconds, and in some particularly preferred cases, may allow a firing repeat rate of at least one shot per second.

Operation of the system may return at any stage to steps 164 or 166 for acquiring a new target. On completion of a mission, or when refilling of a magazine of projectiles or power supply replenishment are required, the UAV 108 returns to its base, which is typically also its launch site.

The above modules and method steps are merely exemplary, and some or all of them may be omitted in certain implementations of the invention. For example, in the aforementioned manually-controlled implementation, navigation of the UAV, and aiming and firing of the weapon may be controlled manually by the remote operator, rendering most of the modules and method steps either redundant or at least having greatly reduced requirements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An armed aerial platform comprising:
   (a) a weapon for firing a projectile from a barrel, said barrel defining a weapon axis; and
   (b) a UAV comprising:
      (i) an airframe including a rigid body, said rigid body being formed with a central vertical slot for receiving said weapon,
      (ii) a propulsion system including at least four rotary propulsion units supported by said airframe in a multirotor UAV configuration, and
      (iii) a single-axis gimbal mechanism supporting said weapon within said slot and controlling an inclination angle of said weapon axis relative to said body,
   wherein said rigid body defines a horizontal reference plane, and wherein said slot is an open-ended slot extending to one end of said body, said gimbal mechanism configured to control an inclination of said weapon axis through a range of angles enabled by said open-ended slot spanning a range above and below said horizontal reference plane.

2. The armed aerial platform of claim 1, wherein said gimbal mechanism supports said weapon within said slot such that said weapon axis passes substantially through a center of gravity of the armed aerial platform.

3. The armed aerial platform of claim 2, wherein said gimbal mechanism supports said weapon so as to be pivotable about a pivot axis substantially aligned with said center of gravity of the armed aerial platform.

4. The armed aerial platform of claim 1, wherein said rigid body further includes reinforcing elements which extend around sides of said slot so as to enhance rigidity of said rigid body.

5. The armed aerial platform of claim 1, wherein said UAV is a man-portable UAV.

6. The armed aerial platform of claim 1, wherein said weapon is a self-loading weapon for firing a plurality of projectiles from said barrel.

7. The armed aerial platform of claim 1, further comprising a control system including at least one processor, said control system in communication with said gimbal mechanism and with said propulsion system, said control system responsive to an alignment adjustment signal to:
   (a) actuate said gimbal mechanism to change an inclination angle of said weapon axis; and
   (b) actuate said propulsion system to change an azimuthal alignment of said weapon axis.

8. The armed aerial platform of claim 7, wherein said control system is configured to perform a tracking algorithm to generate said alignment adjustment signal.

9. The armed aerial platform of claim 8, further comprising at least one image sensor mounted on the armed aerial platform and in communication with said control system, said tracking algorithm including image processing to track a target within images from said at least one image sensor.

10. The armed aerial platform of claim 9, wherein said at least one image sensor includes a first image sensor having a first field of view and a second image sensor having a second field of view, said second field of view being smaller than said first field of view, and wherein at least said second image sensor is associated with said weapon so that said second field of view is aligned parallel to said weapon axis.

11. The armed aerial platform of claim 9, wherein said tracking algorithm further generates a firing actuation signal synchronized with variations in a time-varying misalignment of said weapon axis relative to an aim point, the aim point being calculated as a function of a location of the target within images from said at least one image sensor.

12. A UAV system comprising:
   (a) the armed aerial platform of claim 1; and
   (b) a remote controller station,
   wherein said armed aerial platform further comprises:
   at least one image sensor mounted on the armed aerial platform,
   an onboard communications subsystem for transmitting images from said at least one image sensor and for receiving control signals for controlling the armed aerial platform, and wherein said remote controller station comprises:
   a remote communications subsystem, a display, a user input device and a remote controller associated with said remote communications subsystem, said display and said user input device, wherein said remote controller is configured to receive said images via said remote communications subsystem, to display said images on said display, and to receive from the user input device an input indicative of a target location within said images, said input being used to generate said control signals for transmission to said armed aerial platform.

13. The UAV system of claim 12, wherein said user input device includes a fire weapon input for generating a fire command for transmission to the armed aerial platform.

14. A method for operating an armed aerial platform, the method comprising the steps of:
   (a) providing the armed aerial platform of claim 1;
   (b) acquiring a target in images derived from an image sensor mounted on the armed aerial platform; and
   (c) aligning the weapon axis with the target by a combination of motion of the single-axis gimbal to align the weapon relative to the UAV about one axis and maneuvering the UAV about at least one additional axis.

15. The method of claim 14, further comprising: tracking the target in the images derived from the image sensor and adjusting the single-axis gimbal and the UAV orientation to maintain the weapon axis aligned with the target.

16. The method of claim 14, further comprising generating a firing actuation signal synchronized with variations in a time-varying misalignment of the weapon axis relative to an aim point, the aim point being calculated as a function of a location of the target within images from the image sensor.

* * * * *